United States Patent Office 3,060,025
Patented Oct. 23, 1962

3,060,025
PHOTOPOLYMERIZATION PROCESS OF IMAGE REPRODUCTION

Marion Burg, Metuchen, and Abraham Bernard Cohen, Springfield, N.J., assignors to E. I. du Pont de Nemours and Company, Wilmington, Del., a corporation of Delaware No Drawing. Filed Nov. 3, 1959, Ser. No. 850,522
17 Claims. (Cl. 96—28)

This invention relates to processes of image reproduction. More particularly, it relates to such processes wherein finely divided discrete solid particles, e.g., dyes, inks, pigments, color formers and metals, are transferred with the aid of heat and in the form of an image to the surface of an element containing photopolymerizable image areas. Still more particularly, it relates to such processes wherein the particulate image is transferred to a receptor surface.

Copying methods and processes embodying thermal transfer and dusting procedures are known. The known methods of copying or transferring an image, however, have one or more of the following disadvantages: (1) they involve the use of an image which is tacky at room temperature thereby requiring special handling of the unexposed film and fixing after development, (2) they require solvents or other wet operations to make the substances tacky when tackiness is required, (3) they deteriorate in properties upon aging and (4) they require long exposure times.

An object of this invention is to provide new and practical processes of image reproduction. Another object is to provide such processes which utilize elements having layers embodying addition photopolymerizable image areas. A further object is to provide such processes which do not require the use of liquids in the image transfer step. A still further object is to provide such processes which are simple and dependable and dry, utilizing heat, during the image transfer step. Still further objects will be apparent to those skilled in the art of image reproduction from the following detailed description.

The image reproduction processes of this invention, in their broader aspects, comprise (A) placing a layer of finely divided discrete particles of material which are solid at the transfer temperature and are loosely bound in said layer into contact with the surface of a separate layer containing a thermoplastic image in said surface, said separate layer being solid below 40° C. and containing (1) underexposed image areas which are thermally transferable by having a transfer (or stick) temperature above 40° C. and below 220° C. comprising (*a*) a thermoplastic organic polymer solid at 50° C. and (*b*) an ethylenically unsaturated compound containing at least 1 terminal ethylenic group, having a boiling point above 100° C. at normal atmospheric pressure, being capable of forming a high polymer by photoinitiated addition polymerization and having a plasticizing action on said thermoplastic polymer; said constituents (*a*) and (*b*) being present in amounts from 3 to 97 and 97 to 3 parts by weight, respectively, and (2) complementary adjoining coplanar non-tacky image areas (i.e., exposed reverse image areas) solid at 50° C. and comprising an addition polymer of an aforesaid unsaturated compound and said thermoplastic polymer, (B) maintaining said surfaces in contact while maintaining the surface of said separate layer at a temperature of at least 40° C. and (C) separating said surfaces whereby said particles are transferred to the surface of the separate layer. The process can be repeated by bringing another layer of finely divided discrete particles of material into contact with the surface of the separate layer. In general, the layers are maintained in surface contact for a period of about 0.1 to about 300 seconds and one transfer step is adequate.

In a further aspect of the invention, the particles which are transferred to the surface of the separate layer to form an image can be transferred together with adherent material in the layer to the surface of an image-receptive support, e.g., a sheet of paper, metal, synthetic polymer, fabric or screen, during which time the contacting surfaces are heated to a temperature between about 40° C. and 220° C. and while still warm the surfaces are separated. The particles and a portion of the thermoplastic photopolymerizable composition adherent to the particles are transferred to the paper, metal, etc. support in the areas corresponding to the unexposed, or least exposed, areas to give at least one duplicate copy of the original positive, negative or original image. Multiple copies can be obtained by repeating the heat transfer procedure. In making multiple copies, the particle transfer step described in the previous paragraph can be repeated with the used element.

In the foregoing process, the layer containing the ethylenically unsaturated compound may, in addition to constituents (*a*) and (*b*), contain (*c*) an addition polymerization initiator activatable by actinic light and thermally inactive below 185° C. in an amount from 0.001 to 10 parts by weight and, if desired, (*d*) an addition polymerization inhibitor in an amount from 0.001 to 2.0 parts by weight.

The term "underexposed" as used herein is intended to cover the image areas which are completely unexposed or partially exposed so that there is a material amount of the addition polymerization compound still present and insufficient addition polymer image has been formed to bind the constituents so that the image areas will not adhere to solid particles at a tack temperature or be non-thermally transferable at a stick or transfer temperature at which the underexposed areas are thermally transferable to the surface of the layer containing the discrete particles. The term "transfer temperature" means the temperature at which the image areas in question stick or adhere, within 10 seconds, under slight pressure, e.g., thumb pressure, to analytical filter paper (Schleicher & Schuell analytical filter paper #595).

In general, in the process, components (*a*) and (*b*) are present in amounts from 10 to 95 and 5 to 90 parts by weight respectively, based on the weight of the polymer and monomer. Also, the compositions are such that they do not melt at temperatures below 40° C. and are not thermally polymerizable within 0.5 second at temperatures below the melting point of the composition.

The foregoing thermoplastic image-bearing elements can be made by exposing to actinic light, imagewise, a layer having the constitution defined above for the thermally transferable image areas of item (1) above until substantial addition polymerization takes place in the exposed areas to form an addition polymer and no significant polymerization takes place in the underexposed areas. The exposure can be through a line or halftone negative or positive, or a stencil in contact with the layer or by reflectographic or projection exposure.

While the adition polymerizable component present in the underexposed areas of the photopolymerizable element can be a monomeric ethylenically unsaturated compound capable of polymerizing or forming a high polymer in a short time, e.g., 0.5–10 seconds, by photoinitiated polymerization as disclosed in Plambeck U.S. 2,760,863, the particularly useful compounds fall within a general class, namely, normally non-gaseous (i.e., at 20° C. and atmospheric pressure) ethylenically unsaturated monomeric compounds having at least one terminal ethylenic group, preferably two, a normal boiling point above 100° C., and a plasticizing action on the thermoplastic polymer.

In practicing the invention, a photopolymerizable element having an image-yielding layer containing the above components is exposed to actinic radiation through a stencil, a photographic process transparency, e.g., a photographic positive, negative, two-tone or halftone, a light-transmitting paper, or to an image or printed matter on an opaque support by means of reflex exposure. This image-containing element is then used in the reproduction processes described above. In various embodiments of the invention, pigments, e.g., carbon (Examples I and II), graphite (Example III), magnetic iron (Example IV) and phosphor particles (Example V) can be coated on a separate surface and transferred to the unexposed areas of a photopolymerizable composition upon the application of heat. In like manner pigment particles can be stripped from a self-supporting surface, e.g., a carbon or graphite core or roll (see Example VII). Color forming constituents which form colored compounds when heat is applied can be stripped from a separate support (see Example VI thermographic) or the stripped layer can contain color forming components which form colors in the presence of other color forming components in the presence of heat (see Example VIII). Multiple copies of the stripped image can be made by spirit duplicating processes (see Example IX) and portions of metallized layers can be stripped from a support (see Example X).

In a preferred aspect of the invention the photopolymerizable composition used to make the photopolymerizable layer comprises:

(1) As the thermoplastic polymer, a polyethylene oxide or glycol having a molecular weight of at least 100,000;

(2) As the ethylenically unsaturated compound, bis acrylates and methacrylates of glycols of 1–5 carbon atoms and polyethylene glycols of molecular weight from about 200 to about 500;

(3) A free radical generating addition polymerization initiator inactive thermally below 185° C., e.g., anthraquinone, and (4) A thermal addition polymerization inhibitor, e.g., p-methoxyphenol which layer has a thickness, when dry, of 0.1 to 10 mils.

In an exemplary procedure, the foregoing layer on a flexible film support, e.g., a copolymer coated polyethylene terephthalate film base as described in Alles et al. 2,627,088, is exposed to actinic radiation, e.g., from an 1800-watt, high-pressure mercury-arc lamp at a distance of 2.0 inches from the surface for about 2 to 10 seconds whereby addition polymerization takes place in the exposed areas without any polymerization in unexposed areas. A second support, preferably polyethylene terephthalate coated with a pigment layer, e.g., a colloidal carbon dispersion, etc. but which may be a self-supported carbon or graphite core, is brought into contact with the exposed photopolymerizable composition. The sandwich formed is heated at a temperature of 50 to 150° C. for 0.1 to 10 seconds, preferably for about 1 second, and the supports separated. A layer of pigment is stripped from its support and is transferred to the unexposed areas of the photopolymerizable composition forming a copy of the original image. A reverse copy of the image is formed on the pigmented surface, depending on the thickness of the pigmented layer.

At least one copy of the pigmented image can be made if it is brought into intimate contact with a receptor surface, preferably paper, and the element formed is heated for up to about 3 seconds at 50 to 170° C.

The invention will be further illustrated by, but is not intended to be limited to, the following detailed examples which illustrate the general procedures and also the specific procedures referred to above.

*Example I*

A photopolymerizable solution was prepared by mixing 30 grams of an aqueous solution of low viscosity, polyethylene oxide (average molecular weight of 100,000) (5.6% by weight) and 1.7 grams of polyethylene glycol diacrylate (average molecular weight of diol precursor is 300) containing 0.002 gram of anthraquinone as a photoinitiator, and 0.002 gram of p-methoxyphenol as a thermal inhibitor. The solution was coated to a thickness of 20 mils on the surface of a sheet 4 mils in thickness of polyethylene terephthalate photographic film base which was subcoated with vinylidene chloride/methyl acrylate/itaconic acid as disclosed in Alles et al. U.S. Patent 2,627,088. The photopolymerizable coating was allowed to dry for 2 days in the dark at room temperature. A 2-mil thick photopolymerizable film on the support was obtained. The dry, coated surface was brought into contact with the emulsion side of a photographic negative and then placed in a vacum frame. The vacuum frame containing the thermoplastic photopolymerizable element and the negative was placed beneath a 1800-watt, high-pressure mercury-arc lamp and the coating exposed through the negative to 1.75-watts of actinic radiation per square inch for 5 seconds. A 1-mil thick polyethylene terephthalate film support was skim coated to a dry thickness of 0.5 mil with a colloidal carbon dispersion prepared from a carbon-water dispersion (50 percent by weight carbon of 73 mμ particle size), low viscosity polyethylene oxide (molecular weight of 100,000) (6 percent by weight based on the weight of carbon) and ethanol to reduce the carbon to 10 percent by weight of the dispersion. The dry carbon surface was brought into intimate contact with the exposed photopolymerizable surface and the sandwich heated by rapidly passing a hot iron preheated to 72° C. over the back surface of the carbon-polyethylene terephthalate support. After allowing the two surfaces to cool for 10 seconds they were separated. The carbon transferred to the unexposed thermoplastic areas on the polyethylene terephthalate photographic film base support forming a negative image on the support. A positive image, remained on the carbon support. Both images had high contrast and fidelity. The copy of the negative was brought into contact with a paper support and the element formed was heated through the polyethylene terephthalate photographic film base support by means of a flat, hot surface at a temperature of about 150° C. for about 3 seconds. A duplicate copy of the original photographic negative was obtained on the paper support as the result of the transfer of the carbon and unexposed thermoplastic material to the paper support. Up to 5 copies were prepared by this heat transfer procedure using separate, receptor paper supports.

*Example II*

A photopolymerizable solution was prepared by mixing 44 g. of a methylene chloride solution of polyethylene terephthalate/sebacate (50 mole percent) (18% by weight of solids), 8 g. of triethylene glycol diacrylate, 0.008 g. of anthraquinone and 0.008 g. of p-methoxyphenol. The solution was coated to a thickness of 10 mils on a 4-mil thick polyethylene terephthalate photographic film base support as described in Example I. The film was dried in air in the dark and the photopolymerizable film obtained was 4-mils thick. The dry photopolymerizable surface was brought into contact with a photographic positive and exposed in a vacum frame to 1.75 watts of actinic radiation per square inch for 2 seconds from the light source described in Example I. The exposed surface was brought into intimate contact with a surface of dry colloidal carbon on a 1-mil thick polyethylene terephthalate support and heated as described in Example I. The carbon surface transferred from the polyethylene terephthalate support to the unexposed, thermoplastic areas on the polyethylene terephthalate photographic film base support to form a positive type image. A negative type image was formed on the original carbon support. Up to 5 copies of the original photographic positive were obtained by the heat transfer procedure described in Example I.

*Example III*

Example I was repeated except that a 0.5-mil thick (dry) layer of a graphite-isopropanol dispersion (20 percent solids) was coated on a 1-mil thick polyethylene terephthalate film base support. The graphite coated film was brought into intimate contact with an exposed photopolymerized layer as described in Example I. Results similar to those found in Example I were obtained, both images having high contrast and fidelity.

*Example IV*

Example I was repeated except that 1 g. of finely divided magnetic iron (25 mμ particle size) was used as the pigment layer on the polyethylene terephthalate film support. The magnetic iron was coated on its film support as a dispersion in an aqueous binder solution of polyethylene oxide (molecular weight of 100,000) (1 percent by weight of solids). The magnetic iron layer was brought into intimate contact with the exposed photopolymerized layer, heat was applied as described in Example I and the layers were separated. The magnetic iron stripped from its support and adhered to the unexposed areas of the photopolymerized layer. The results were similar to those obtained in Example I.

*Example V*

Example I was repeated except that fine particles of a zinc sulfide, silver-activated phosphor dispersed in an aqueous solution of polyethylene oxide described in Example IV was used as the pigment layer on the polyethylene terephthalate support. The phosphor layer was brought into intimate contact with the exposed photopolymerized layer and heat was applied. The phosphor adhered to the unexposed areas of the photopolymerized composition after the two supports were stripped apart. Several copies of the phosphor image were obtained using the heat transfer procedure described in Example I. The images luminesced when exposed to an ultraviolet light source.

*Example VI*

A thermoplastic photopolymerizable composition was prepared from 12 g. of low viscosity polyvinyl acetate methacrylate (containing a maximum of 20 mole percent of methacrylate groups and prepared by esterification of 86–89% hydrolyzed polyvinyl alcohol), 12 ml. of ethanol, 2.54 g. of polyethylene glycol diacrylate described in Example I, 0.009 g. of anthraquinone and 0.009 g. of p-methoxyphenol and was coated on a 4-mil thick sheet of polyethylene terephthalate photographic film base described in Example I to a dry thickness of 2 mils. The photopolymerizable layer was exposed to actinic light through a photographic negative as described in that example. The time of exposure was 2 seconds. A 1-mil thick polyethylene terephthalate film support was coated to a thermographic dry thickness of 0.5 mil with a solution prepared from 20 g. of an aqueous solution of low viscosity polyethylene oxide (molecular weight of 100,000) (2% solids by weight) and 105 mg. of 3-cyano-4,5 dimethyl-5-hydroxy-3-pyrrolin-2-one and 34 mg. of copper acetate. The thermographic layer was brought into intimate contact with the exposed photopolymerized layer and heat was applied by means of a hot, flat surface. The sandwich was heated at 80° C. for 3 seconds and the two surfaces were stripped apart. The thermographic layer stripped from its support and adhered to the photopolymerized surface only in the areas in contact with the unexposed photopolymerized surface. Up to four latent thermographic copies of the original photographic negative were obtained by the thermal transfer process of Example I using a new paper sheet each time. Subsequent heating of the paper supports to 170° C. for 3 seconds produced black images.

*Example VII*

A photopolymerizable element was prepared and exposed through a photographic positive as described in Example I. The element was then brought into contact with a graphite roll preheated to 60° C. and while the photopolymerized element was in intimate contact with the roll the underside of the base support of the photopolymerized layer was heated to 75° C. by means of a radiant heating source, an infrared 275-watt lamp. That portion of the photopolymerized layer in intimate contact with the graphite roll which was not exposed to actinic light was coated with a fine film of graphite to form a black image. A duplicate copy of the positive was obtained by heating the graphitic image at 150° C. for about 2 seconds while in intimate contact with a separate paper support and then separating the warm supports.

*Example VIII*

A photopolymerizable element was prepared and exposed to actinic light through a photographic positive by the procedure described in Example I except that the photopolymerizable composition contained 0.5 g. of lead acetate. A solution consisting of 5 g. of thioacetamide and 50 g. of an aqueous binding solution of polyethylene oxide (1 percent solids by weight) was coated on a 1-mil thick polyethylene terephthalate film. After drying in the air in the dark, a 0.2-mil thick thioacetamide-binder layer was obtained. The thioacetamide-binder surface was brought into intimate contact with the exposed photopolymerized layer containing the lead acetate and the sandwich formed was heated and stripped apart as described in Example I. The thioacetamide-binder layer stripped from its support and adhered to the photopolymerized layer forming a black image. The black image was brought into intimate contact with a paper receptor support and the sandwich formed heated at 90° C. for 3 seconds. The two surfaces were separated and an image was transferred to the paper receptor. The thermal transfer procedure was repeated 3 times using fresh paper receptors to yield 3 more copies.

*Example IX*

A photopolymerizable composition was prepared and exposed to actinic light through a photographic negative as described in Example VI. A 1-mil thick polyethylene terephthalate film support was coated to a dry thickness of 0.5 mil with binder-dye solution prepared from 20 g. of a solution of low viscosity polyethylene oxide (molecular weight of 100,000) (2% solids by weight) and 0.1 g. of a blue-green dye, Calcocid Green S (C.I. 44090). The binder-dye layer was brought into intimate contact with the exposed photopolymerized layer and the system heated to 80° C. for 0.5 second. The two surfaces were stripped apart and the dyed surface separated from its support in the areas in contact with the unexposed areas of the photopolymerized composition. The cooled polymerized surface was wet with an ethanol-water solution (40% by volume) and was brought into intimate contact with a paper support at room temperature. When the surfaces were separated a blue-green image was obtained on the new paper receptor as the result of dye transfer. Multiple copies were obtained by repeating the wet transfer procedure.

*Example X*

A photopolymerizable composition prepared from a solution containing 6.0 g. cellulose acetate butyrate (acetyl content 20.5%, butyryl content 26%; having a viscosity of 15–35 seconds determined by A.S.T.M. method D–1343–5T in the solution described as Formula A, A.S.T.M. method D–871–54T), 90 g. acetone, 4.0 g. polyethylene glycol diacrylate, 0.05 g. of phenanthraquinone, 0.05 g. of Calcocid Green S (C.I. 44090) and 0.004 g. of p-methoxyphenol was coated to a dry thickness of 0.5 mil on the polyethylene terephthalate photographic film base support. The film was exposed through a photographic positive to 1.75 watts of actinic radiation per square inch for 1 second as described in Example I. A strip of "Teflon" tape, a tetrafluoroethylene resin manufactured by E.I. du Pont de Nemours & Co., Inc., 3 mils in thickness was placed in a vacuum evaporator and a thin layer of aluminum evaporated and deposited on the "Teflon" surface (0.05 mil in thickness). The aluminum surface was then brought into intimate contact with the exposed photopolymerized surface and the sandwich formed was heated to 147° C. for 7 seconds and the two surfaces allowed to cool to room temperature before separating. An aluminum image was formed on the photopolymerized surface by the adherence of the aluminum layer to the unexposed areas.

*Example XI*

A dye-containing photopolymerizable solution was prepared by mixing 6 g. of an acetone-cellulose acetate butyrate solution (20% by weight of solids) (the cellulose acetate butyrate contains 20% acetyl groups, 26% butyryl groups and has a viscosity of 56 to 131 poises determined by A.S.T.M. method D–1343–54T in the solution described as Formula A, A.S.T.M. method D–871–54T), 0.8 g. of polyethylene glycol diacrylate (average molecular weight of the diol precursor is 300), 1.5 ml. of ethanol, and 10 mg. of Calcocid Green S dissolved in 2 ml. of ethanol and 5 ml. of acetone. The photopolymerizable solution was coated on a 1.5-mil thick polyethylene terephthalate film base to a dry thickness of 0.5 mil. The coated film was brought into contact with the emulsion side of a line process photographic positive and was placed in a vacuum frame. The surface was exposed to 1.75 watts of actinic radiation per square inch for 22 seconds from a 1,800 watt, high pressure, mercury-arc lamp. A 1-mil thick polyethylene terephthalate film support was coated to a dry thickness of 1 mil with a colloidal carbon dispersion prepared as described in Example I. The dry carbon surface was brought into intimate contact with the exposed surface of the photopolymerizable composition and the sandwich was heated at 125° C. for 3 seconds by means of a flat, hot surface. While still warm the two surfaces were separated, and the colloidal carbon on the polyethylene terephthalate film base support was stripped from its support over its entire surface. The stripped carbon surface was brought into intimate contact with a paper support, and the element formed was heated at 135° C. for 10 seconds. When the two surfaces were separated a black image was obtained on the paper support corresponding to the unexposed area of the photopolymerizable composition.

The photopolymerizable compositions useful in the present invention comprise (1) a thermoplastic polymeric compound, (2) an addition polymerizable ethylenically unsaturated compound, and preferably but not necessarily (3) an addition polymerization initiator, and (4) a thermal polymerization inhibitor.

Suitable thermoplastic polymers for component (*a*) include:

(A) Copolyesters, e.g., those prepared from the reaction product of a polymethylene glycol of the formula $HO(CH_2)_nOH$, wherein *n* is a whole number 2 to 10 inclusive, and (1) hexahydroterephthalic, sebacic and terephthalic acids, (2) terephthalic, isophthalic and sebacic acids, (3) terephthalic and sebacic acids, (4) terephthalic and isophthalic acids and (5) mixtures of copolyesters from an aforesaid glycol and (i) mixed terephthalic, isophthalic, and sebacic acids, or (ii) mixed terephthalic, isophthalic, sebacic and adipic acids.

(B) Nylons or polyamides, e.g., N-methoxymethyl polyhexamethylene adipamide;

(C) Vinylidene chloride copolymers, e.g., vinylidene chloride/acrylonitrile; vinylidene chloride/methacrylate and vinylidene chloride/vinyl acetate copolymers;

(D) Ethylene/vinyl acetate copolymer;

(E) Cellulose ethers, e.g., methyl cellulose and ethyl cellulose;

(F) Polyethylene;

(G) Synthetic rubbers such as butadiene/acrylonitrile copolymers and 2-chlorobutadiene-1,3 polymers;

(H) Cellulose esters, e.g., cellulose acetate, cellulose acetate succinate and cellulose acetate butyrate;

(I) Polyvinyl esters, e.g., polyvinyl acetate/acrylate, polyvinyl acetate/methacrylate, polyvinyl acetate;

(J) Polyacrylate and alpha-alkyl polyacrylate esters, e.g., polyacrylate, polymethyl methacrylate and polyethyl methacrylate;

(K) High molecular weight polyethylene oxides or polyalkylene glycols having average molecular weights from about 4,000 to 10,000 and higher;

(L) Polyvinyl chloride and copolymers, e.g., polyvinyl chloride/acetate;

(M) Polyvinyl acetals, e.g., polyvinyl butyral, polyvinyl formal;

(N) Polyformaldehydes;

(O) Polyurethanes;

(P) Polycarbonates;

(Q) Polystyrenes.

To the thermoplastic polymer constituent of the photopolymerizable composition can be added non-thermoplastic polymeric compounds to give certain desirable characteristics, e.g., to improve adhesion to the base support, adhesion to the receptor support on transfer, wear properties, chemical inertness, etc. Suitable non-thermoplastic polymeric compounds include polyvinyl alcohol, cellulose, gelatin, phenolic resins and melamine-formaldehyde resins, etc. In addition, the photopolymerizable layers can also, if desired, contain immiscible polymeric or non-polymeric organic or inorganic fillers or reinforcing agents which are essentially transparent, e.g., the organophilic silicas, bentonites, silica, powdered glass, colloidal carbon, etc., in amounts varying with the desired properties of the photopolymerizable layer. The fillers are useful in improving the strength of the composition, reducing tack and in addition, as coloring agents.

Suitable addition polymerizable ethylenically unsaturated compounds (*b*) which can be used with the above-described thermoplastic polymer compounds include, preferably an alkylene or a polyalkylene glycol diacrylate prepared from an alkylene glycol of 2 to 15 carbons or a polyalkylene ether glycol of 1 to 10 ether linkages and those disclosed in the application of Martin and Barney, Serial No. 596,766, filed July 9, 1956, U.S. Patent 2,927,-022, March 1, 1960, e.g., those having a plurality of addition polymerizable ethylenic linkages, particularly when present as terminal linkages, and especially those wherein at least one and preferably most of such linkages are conjugated with a doubly bonded carbon, including carbon doubly bonded to carbon and to such heteroatoms as nitrogen, oxygen, and sulfur. Outstanding are such materials wherein the ethylenically unsaturated groups, especially the vinylidene groups, are conjugated with ester or amide structures. The following specific compounds are further illustrative of this class: unsaturated esters of polyols, particularly such esters of the α-methylene carboxylic acids, e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, the bis-acrylates and methacrylates of polyethylene glycols of molecular weight 200–500, and the like; unsaturated amides, particularly those of the α-methylene carboxylic acids, and especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis($\gamma$-methacrylamidopropoxy) ethane, $\beta$-methacrylamidoethyl methacrylate, N-($\beta$-hydroxyethyl)-$\beta$-(methacrylamido)ethyl acrylate and N,N-di($\beta$-methacrylyloxyethyl) acrylamide; vinyl esters such as divinyl succinate, divinyl adipate, divinyl phthalate, divinyl terephthalate, divinyl benzene-1,3-disulfonate, and divinyl butane-1,4-disulfonate; and unsaturated aldehydes, such as sorbaldehyde (hexadienal). An outstanding class of these preferred addition polymerizable components are the esters and amides of $\alpha$-methylene carboxylic acids and substituted carboxylic acids with polyols and polyamines wherein the molecular chain between the hydroxyls and amino groups is solely carbon or oxygen-interrupted carbon. The preferred monomeric compounds are difunctional. The amount of monomer added varies with the particular thermoplastic polymer used.

A preferred class of addition polymerization initiators (*c*) activatable by actinic light and thermally inactive at and below 185° C. are the substituted or unsubstituted polynuclear quinones, which compounds have two intracyclic carbonyl groups attached to intracyclic carbon atoms in a conjugated six-membered carbocyclic ring, there being at least one aromatic carbocyclic ring fused to the ring containing the carbonyl groups. Suitable such initiators include 9,10-anthraquinone, 1-chloroanthraquinone, 2-chloroanthraquinone, 2-methylanthraquinone, 2-tert-butylanthraquinone, octamethylanthraquinone, 1,4-naphthoquinone, 9,10-phenanthrenequinone, 1,2-benzanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone alpha-sulfonic acid, 3-chloro-2-methylanthraquinone, retenequinone, 7,8,9,10-tetrahydronaphthacenequinone, and 1,2,3,4-tetrahydrobenz[a]anthracene-7,12-dione. Other photo-initiators which are also useful include vicinal ketaldonyl compounds, such as diacetyl, benzil, etc.; $\alpha$-ketaldonyl alcohols, such as benzoin, pivaloin, etc.; acyloin ethers, such as benzoin methyl or ethyl ethers, etc.; $\alpha$-hydrocarbon substituted aromatic acyloins, including $\alpha$-methylbenzoin, $\alpha$-allylbenzoin, and $\alpha$-phenylbenzoin.

Suitable thermal polymerization inhibitors (*d*) that can be used in addition to the preferred p-methoxyphenol include hydroquinone, and alkyl and aryl-substituted hydroquinones, tertbutylcatechol, pyrogallol, copper resinate, naphthylamines, beta-naphthol, cuprous chloride, 2,6-di-tert-butyl-p-cresol, phenothiazine, pyridine, nitrobenzene and dinitrobenzene. Other useful inhibitors include p-toluquinone and chloranil, and thiazine dyes, e.g., Thionine Blue G (C.I. 52025), Methylene Blue B (C.I. 52015) and Toluidine Blue O (C. I. 52040).

The photopolymerizable composition is preferably coated on a base support. Suitable support materials are stable at the heating temperatures used in the instant invention. Suitable bases or supports include those disclosed in Plambeck U.S. Patent 2,760,863, col. 5, lines 14 to 33, glass, wood paper, cloth, cellulose esters, e.g., celluose esters, e.g., cellulose acetate, cellulose propionate, cellulose butyrate, etc. and other plastic compositions, etc. The support may have in or on its surface and beneath the photopolymerizable stratum an antihalation layer as is disclosed in said Plambeck patent.

The photopolymerizable layer is exposed to actinic radiation, generally through a process transparency, e.g., a process negative or positive (an image-bearing transparency consisting solely of substantially opaque and substantially transparent areas where the opaque areas are substantially of the same optical density, the so-called line or halftone negative or positive). A continuous tone process transparency can also be used. It is possible to expose through paper or other light transmitting materials. A stronger light source or longer exposure times must be used, however. Reflex exposure can also be used, e.g., in copying from paper or translucent films.

Since free-radical-generating addition-polymerization initiators activatable by actinic light generally exhibit their maximum sensitivity in the ultraviolet range, the light source should furnish an effective amount of this radiation. Such sources include carbon arcs, mercury-vapor arcs, fluorescent lamps with special ultraviolet-light-emitting phosphors, argon glow lamps, electronic flash units and photographic flood lamps. Of these, the mercury-vapor arcs, particularly the sunlamp type, and the fluorescent sunlamps, are most suitable. The sunlamp mercury-vapor arcs are customarily used at a distance of one and one-half to ten inches from the photopolymerizable layer.

After exposure of the photopolymerizable layer, the exposed composition is brought into intimate contact with a separate support, e.g., a roll of carbon or graphite; a roll coated with pigment dispersions; a roll which has a continuously replenished pigment or inked surface; a separate support coated with pigments with or without dyes, thermographic compounds, color forming compounds, hydrophilic and hydrophobic surfaces. A binder material is useful to aid in the adhesion of some of the above-mentioned materials to their support. In addition, the separate support may be a metallized film.

The sandwich formed by bringing into intimate contact the exposed photopolymerized surface and the separate surface is heated to effect the transfer of the pigment, coated surface, etc., in the areas corresponding to the unexposed areas of the photopolymerized composition. Heat can be applied by means well known in the art, e.g., rollers flat heating surfaces, radiant sources, e.g., heating lamps, etc.

The support on the reverse side of the photopolymerized layer, the separate support or both may be heated. The heating temperatures and contact periods vary with the different types of photopolymerizable compositions used. The temperature generally ranges from 50 to 150° C. and the contact time from 0.1 to 10 seconds.

Suitable useful pigments which can be coated on the separate support include $TiO_2$, colloidal carbon, graphite, phosphor particles, ceramics, clays, metal powders such as aluminum, copper, magnetic iron, bronze, etc.

Dyes of any type can be added to the pigments or used separately as desired. Examples of useful dyes include Fuchsine (C.I. 42510), Auramine Base (C.I. 41000B), Calcocid Green S (C.I. 44090), Para Magenta (C.I. 42500), Tryparosan (C.I. 42505), New Magenta (C.I. 42520), Acid Violet RRL (C.I. 42425), Red Violet 5RS (C.I. 42609), Nile Blue 2B (C.I. 51185), New Methylene Blue GG (C.I. 51195), C.I. Basic Blue 20 (C.I. 42585), Iodine Green (C.I. 42556), Night Green B (C.I. 42115), C.I. Direct Yellow 9 (C.I. 19540), C.I. Acid Yellow 17 (C.I. 18965), C.I. Acid Yellow 29 (C.I. 18900), Tartrazine (C.I. 19140), Supramine Yellow G (C.I. 19300), Buffalo Black 10B (C.I. 27790), Naphthalene Black 12R (C.I. 20350), Fast Black L (C.I. 51215) and Ethyl Violet (C.I. 42600).

The thermographic materials, e.g., 3-cyano-4,5-dimethyl-5-hydroxy-3-pyrrolin-2-one, etc. and activator, e.g., copper acetate, disclosed in the application of Holland et al. Ser. No. 807,761, filed April 21, 1959 are useful. Other thermographic materials listed in U.S. Patents 2,663,654–7 can be used.

Suitable color forming components which form colored compounds on the application of heat or when brought into contact with other color forming components on a separate support include (1) Organic and inorganic components: dimethyl glyoxime and nickel salts; phenol-phthalein and sodium hydroxide; starch/potassium iodide and oxidizing agent, i.e., peroxides; phenols and iron salts; thioacetamide and lead acetate; silver salt and reducing agent, e.g., hydroquinone.

(2) Inorganic components: ferric salts and potassium thiocyanate; ferrous salts and potassium ferricyanide; copper or silver salts and sulfide ions; lead acetate and sodium sulfide.

(3) Organic components: 2,4-dinitrophenylhydrazine and aldehydes or ketones; diazonium salt and phenol or naphthol, e.g., benzene diazonium chloride and $\beta$-naphthol; p-dimethylabinobenzaldehyde and p-diethylamino-aniline.

Examples of useful hydrophilic substances are gelatin, polyvinyl alcohol, various cellulosics, and polyacrylic acid. Useful hydrophobic surfaces include polystyrene, polyethylene, rubber, glass, tetrafluoroethylene resin, paraffin, and the polyacrylates and methacrylates.

As previously indicated, it may be necessary to use a binder material to adhere the pigment, dye, thermographic additive layer, etc. to the separate support. The binders, not only aid adhesion of the said materials to the base support but enable a smoother surface to be formed. Suitable binders include thermoplastic substances such as polyvinyl acetal, polyvinyl butyral, polyethylene oxide (molecular weight of at least 100,000), cellulose acetate butyrate, copolymers of vinyl chloride and vinyl acetate, polyvinyl acetate, etc.

The pigment, etc., image formed in the unexposed areas of the photopolymerized layer can be copied by bringing said surface into intimate contact with a separate receptor surface and applying heat. The separate surfaces or supports must be stable at the processing temperature. Generally the temperature is in the range of 50 to 170° C. and is applied for up to 3 seconds, preferably less. Multiple copies of the image can be made by repeating the procedure.

The receptor support to which the image is transferred is dependent on the desired use for the transferred image and on the adhesion of the image to the base. Suitable supports include paper, cardboard, metal sheets, foils and meshes e.g., aluminum, copper, steel, bronze, etc.; wood, glass, nylon, rubber, polyethylene, linear condensation polymers such as the polyesters, e.g., polyethylene terephthalate, chromic acid treated polyethylene terephthalate, silk, cotton, viscose rayon cellophane, cellulose esters, e.g., cellulose acetate, cellulose butyrate, etc., and other supports disclosed in Plambeck U.S. Patent 2,791,504 (see col. 5, lines 14 to 33).

The receptive support may contain on its surface chemical compounds which react with compounds being transferred so as to produce differences in color, hydrophilicity or conductivity between the support and the transferred areas or for improved adhesion or brightening of the receptive support. The receptor surface may be smooth, contain roughening agents such as silica, be perforated or be in the form of a mesh or screen.

The instant invention is useful for a variety of copying, printing, decorative and manufacturing applications. In the preparation of a copy, there is formed simultaneously a duplicate copy and a reverse copy. Multicopies of the duplicate copy can be made by bringing into intimate contact the surface of the duplicate copy and a receptor surface and applying heat. The heat transfer method is useful in making office copy and also for decorative effects. Successive transfers can be made, e.g., by bringing into contact the surface of an exposed photopolymerized composition with a heated graphite roll, separating the two surfaces, and bringing the stripped pigment coated photopolymerized image into contact with a receptor surface, e.g., paper. When a halftone negative is used in the process, a copy of a lithographic film can be made which has enhanced contrast. A reverse copy is also obtained. The stripping procedure followed by thermal transfer is useful in the preparation of silk screens. In like manner when separation negatives or positives are used multicolor prints can be made. Masked separation negatives or positives can be used to improve color quality. A fourth, e.g., a gray, separation negative or positive may be employed to give a key image where particularly high quality is desired.

Hydrophilic or hydrophobic surfaces can be stripped from supports by use of the instant invention to make lithographic printing plates. Printed circuits and electrically conducting matrices can be prepared by stripping up metallized films or metal powders.

The transferred images are not only useful for making copies of the original image transparency by dry methods but spirit copying techniques can be employed, e.g., stripped dyed or inked, etc., surfaces can be treated with appropriate solutions and while wet the surface is brought into intimate contact with a receptor support and the surfaces separated. Solvents which are used for the spirit copying, e.g., ethanol-water, water etc. should meter out the dye used and be a nonsolvent for the polymer, i.e., the solubility of the dye and binder are important factors in selecting the solvent.

The instant process has the advantage that by an inexpensive, quick, simple procedure, involving the use of heat and light in a dry system, positives, negatives or both type images can be prepared simultaneously, said images having high contrast and good fidelity. The process is very versatile, e.g., it is useful in making lithographic printing plates and in making printed circuits or electrically conducting matrices. When the process is used for copying, excellent copies can be obtained quickly by bringing into contact the unexposed areas of the photopolymerized composition, having a layer of pigment, metal powder, etc. coated thereon, with a separate surface, applying heat and separating the two surfaces.

What is claimed is:

1. A process which comprises (A) placing a layer of finely divided discrete particles of material which are solid at the transfer temperature and are loosely bound in said layer, into contact with the surface of a separate layer containing a thermoplastic image in said surface, said separate layer being solid below 40° C. and containing (1) underexposed image areas which are thermally transferable on contact by having a transfer temperature above 40° C. and below 220° C. comprising (*a*) a thermoplastic organic polymer solid at 50° C. and (*b*) an ethylenically unsaturated compound containing at least one terminal ethylenic group, having a boiling point above 100° C. at normal atmospheric pressure, being capable of forming a high polymer by photoinitiated addition polymerization and having a plasticizing action on said thermoplastic polymer; said constituents (*a*) and (*b*) being present in amounts from 3 to 97 and 97 to 3 parts by weight, respectively, and (2) exposed complementary adjoining coplanar non-tacky image areas solid at 50° C. and comprising an addition polymer of an aforesaid unsaturated compound and said thermoplastic polymer, (B) maintaining said surfaces in contact while maintaining the surface of said separate layer at a temperature of at least 40° C. and above the tack temperature of the underexposed image areas and (C) separating said surfaces to transfer particles in the underexposed image areas to the surface of the separate layer.

2. A process as defined in claim 1 wherein said thermally transferable image areas contain 0.001 to 10 parts by weight of an addition polymerization initiator activatable by actinic light and inactive thermally below 185° C. per 100 parts by weight of constituents (*a*) and (*b*).

3. A process as defined in claim 1 wherein said thermally transferable image areas contain 0.001 to 10 parts by weight of an addition polymerization initiator activatable by actinic light and inactive thermally below 185° C. and 0.001 to 2.0 parts by weight of an addition polymerization inhibitor, per 100 parts by weight of constituents (*a*) and (*b*).

4. A process as defined in claim 1 wherein said particles are inert pigment particles.

5. A process as defined in claim 1 wherein said particles are inert metallic pigment particles.

6. A process as defined in claim 1 wherein said particles are carbon particles.

7. A process as defined in claim 1 wherein said particles contain color-yielding groups.

8. A process as defined in claim 1 wherein said thermoplastic polymer is a polyethylene oxide having a molecular weight of at least 100,000.

9. A process as defined in claim 1 wherein said ethylenically unsaturated compound is a diacrylate of a diol of the formula $HO(CH_2CH_2O)_nH$ wherein $n$ is an integer from 1 to 20.

10. A process as defined in claim 1 wherein the resulting image is transferred to the surface of an image-receptive support by contact therewith at a temperature of at least 40° C. and above the transfer temperature of the underexposed image areas.

11. A process which comprises exposing with actinic light, imagewise, a photopolymerizable element bearing a stratum of a photopolymerizable material, said stratum comprising (*a*) a thermoplastic organic polymer solid at 50° C., (*b*) an ethylenically unsaturated compound containing at least one terminal ethylenic group, having a boiling point above 100° C. at normal atmospheric pressure, being capable of forming a high polymer by photoinitiated addition polymerization and having a plasticizing action on said thermoplastic polymer, and (*c*) 0.001 to 10.0 parts by weight of an addition polymerization initiator activatable by actinic light and inactive thermally below 185° C., said (*a*) and (*b*) being present in amounts from 3 to 97 and 97 to 3 parts by weight respectively, until polymerization of said unsaturated compound takes place without substantial polymerization in the underexposed areas, (A) placing a layer of finely divided discrete particles of material which are solid at the transfer temperature and are loosely bound in said layer, into contact with the surface of the element resulting from the exposure with actinic light, and (B) maintaining said surfaces in contact while maintaining the surface of said separate layer at a temperature of at least 40° C. and above the tack temperature of the underexposed image areas and separating said surfaces to transfer particles in the unexposed image areas to the surface of the separate layer.

12. A process as defined in claim 11 wherein the exposure is through an image-bearing transparency.

13. A process as defined in claim 11 wherein the exposure is through an image-bearing transparency having light and halftone images.

14. A process as defined in claim 11 wherein said particles are inert pigment particles.

15. A process as defined in claim 11 wherein said particles are inert metallic pigment particles.

16. A process as defined in claim 11 wherein said particles are carbon particles.

17. A process as defined in claim 11 wherein said particles contain color-yielding groups.

References Cited in the file of this patent

UNITED STATES PATENTS

| | | |
|---|---|---|
| 2,073,033 | Szasz | Mar. 9, 1937 |
| 2,616,961 | Groak | Nov. 4, 1952 |
| 2,704,712 | Jackson | Mar. 22, 1955 |
| 2,760,863 | Plambeck | Aug. 28, 1956 |
| 2,845,047 | Oster | Feb. 24, 1959 |

FOREIGN PATENTS

| | | |
|---|---|---|
| 3,130 | Great Britain | July 29, 1880 |
| 3,445 | Great Britain | Mar. 17, 1885 |